A. J. LEHMAN AND G. J. LEXA.
TRACTOR.
APPLICATION FILED APR. 23, 1919.
1,322,028.
Patented Nov. 18, 1919.
2 SHEETS—SHEET 1.
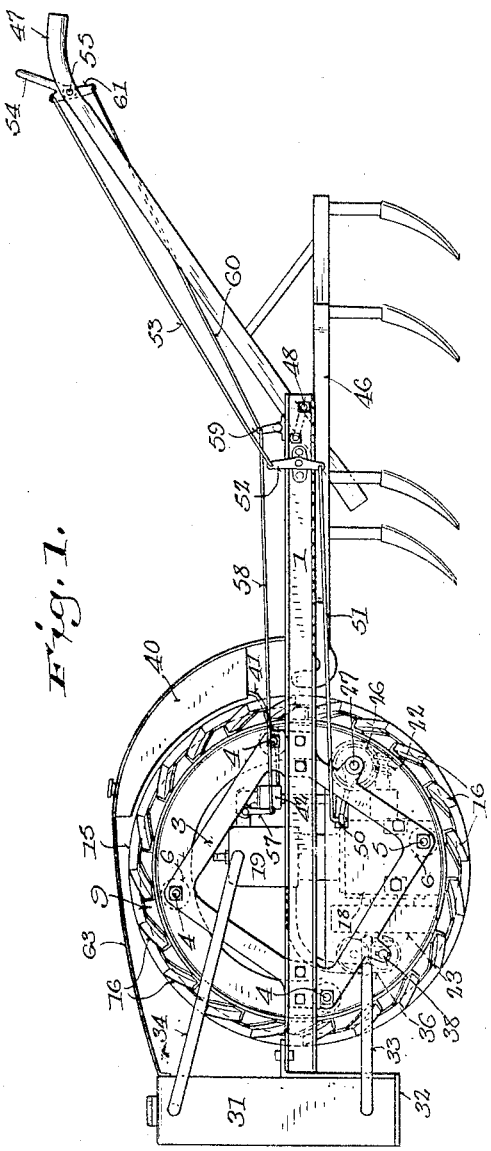
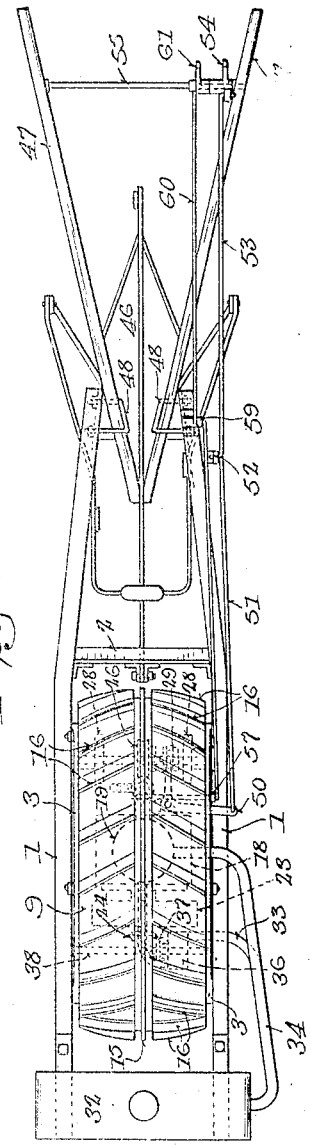
Inventors:
Albertus J. Lehman,
George J. Lexa,
Attorneys.

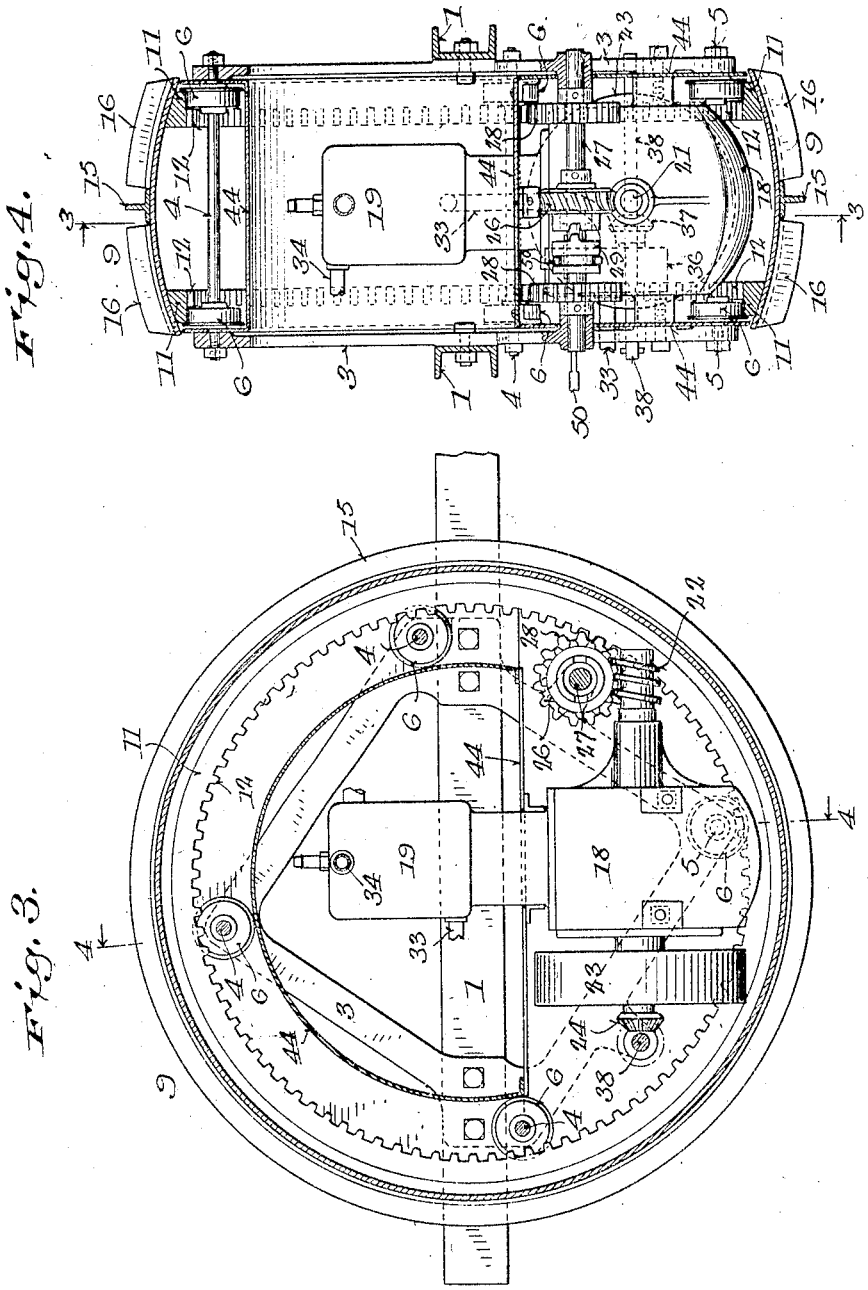

UNITED STATES PATENT OFFICE.

ALBERTUS J. LEHMAN AND GEORGE J. LEXA, OF MILWAUKEE, WISCONSIN.

TRACTOR.

1,322,028.  Specification of Letters Patent.  Patented Nov. 18, 1919.

Application filed April 23, 1919. Serial No. 292,066.

*To all whom it may concern:*

Be it known that we, ALBERTUS J. LEHMAN and GEORGE J. LEXA, citizens of the United States, residing at Milwaukee, in the county of Milwaukee and State of Wisconsin, have invented certain new and useful Improvements in Tractors, of which the following is a specification, reference being had to the accompanying drawing, forming a part thereof.

This invention relates more particularly to one-wheel manually guided tractors.

The main objects of the invention are to facilitate guiding the tractor by hand; to so dispose the engine or motor and its accessories as to secure a better balanced, more self-contained or compact and wieldy machine; to prevent gyroscopic action of the engine fly wheel from resisting or interfering with the tipping of the tractor wheel sidewise in steering the machine; to adapt a tractor to the operation of agricultural and other machines or implements, such as cultivators, plows, mowers, etc., which are ordinarily drawn by one or more horses or draft animals, without material change in the construction or management of such machines or implements; and generally to simplify and improve the construction and operation of tractors of this class.

It consists in the construction, arrangement and combination of parts as hereinafter particularly described and pointed out in the claims.

In the accompanying drawing like characters designate the same parts in the several figures.

Figure 1 is a side elevation of a tractor embodying the invention, and connected with a cultivator; Fig. 2 is a plan view of the machine; Fig. 3 is an enlarged vertical section on the line 3—3, Fig. 4, of the traction wheel, showing the motor in elevation; and Fig. 4 is a vertical cross section of the traction wheel on the line 4—4, Fig. 3, also showing the motor in elevation.

As shown in Figs. 1 and 2, the tractor has a portable frame comprising two substantially parallel and horizontal channel bar members 1, which are rigidly connected with each other by one or more cross bars 2, and two substantially square open frame members 3, bolted diagonally to the inner sides of the bar members 1 opposite each other. The members 3 are connected adjacent their three upper corners by parallel cross rods or shafts 4, and as shown in Figs. 3 and 4, on these rods or shafts and on studs 5 projecting inwardly from the lower corners of the members 3 in alinement with each other, are rotatably mounted at intervals in parallel circles, flanged rollers 6.

A single spokeless and webless supporting, steering and traction wheel 9, is rotatably mounted and guided on the rollers 6 between the side members 1 and 3 of the frame. The traction wheel rim may be conveniently made as shown, of steel plate, rolled or otherwise shaped into concavo-convex form, as shown in Fig. 4, giving the wheel an arched or crowned tread, on which the tractor is adapted to be tipped or rocked sidewise by the operator, for steering or guiding it. Internal bearing rings 11, fastened to the inner concave side of the steel rim near its edges, engage with the rollers 6 on which they are retained and guided by the roller flanges. The bearing rings 11 are formed or provided with internal gears or circular racks 12.

The convex or crowned tread of the traction wheel is provided with a central outwardly projecting circumferential rib or flange 15, which may consist of a T-bar riveted or otherwise fastened to the steel rim of the wheel. On opposite sides of the central rib or flange 15, the tread of the wheel is also provided with obliquely disposed wings or flights 16, which may be made of angle bars riveted or otherwise fastened to the steel rim. The flights or wings 16 increase the traction of the wheel on soft or loose ground, and the rib or flange 15 prevents the wheel from slipping or skidding sidewise.

The tractor is driven by a motor mounted in the frame within the traction wheel 9. A single upright cylinder, oil or internal combustion engine, is shown for this purpose. The closed crank case 1° with which the engine is provided, is bolted or fastened to the frame members 3 below the members 1, and the cylinder 19, which is water-jacketed, extends upwardly therefrom between and above the bar members 1. The crank or driving shaft 21 of the engine, which has bearings in the crank case 18, is disposed lengthwise of the tractor below and parallel with the frame members 1 and transversely to the axis of the traction wheel 9, and is provided at one end with a worm 22, and at the other end with a fly wheel 23 and a bevel gear 24. The worm 22 meshes with a worm gear 26, which is loosely mounted on a transverse shaft 27, supported in bearings in the frame members 3 parallel with the axis of the traction wheel. The shaft 27 is provided with fixed gears or pinions 28, meshing with the racks 12. A clutch 29 splined on the shaft 27 is shiftable into and out of engagement with the corresponding clutch member formed on or attached to the hub of the worm gear 26, for operatively connecting the motor or engine with the traction wheel.

A tank 31, for water or cooling liquid, is supported on hangers 32, fastened to the front ends of the frame bars 1, and is connected with the jacket of the engine cylinder 19 by circulating pipes 33 and 34. A pump 36, connected with the pipe 33 and driven by the bevel gear 24, meshing with a similar gear 37 on a cross shaft 38 extending from the frame members 3 through the traction wheel, causes the water or cooling liquid to circulate through the cylinder jacket, tank and connecting pipes while the engine is in operation.

A gasolene or fuel oil reservoir 40, supported by the frame members 1 over the rear part of the traction wheel 9, is connected by a pipe 41 with the carbureter 42 of the engine.

The rollers 6 and bearing rings 11 on which the traction wheel is rotatably mounted and guided, the transmission mechanism connecting the engine with the traction wheel, and the pump, including its actuating connections with the engine, are all inclosed and protected from dirt by a housing 44, which may be made as shown, of comparatively light sheet metal, an opening being left through the housing in which the engine cylinder 19 is exposed at both sides of the traction wheel to the atmosphere, the free circulation of air through this opening coöperating with the water or cooling liquid circulated through the cylinder jacket, to keep the cylinder cool.

To illustrate one of the various uses to which the tractor may be applied, a cultivator 46 of a standard or common make, shown in Figs. 1 and 2, is connected with the tractor. The handles 47 of the cultivator are rigidly fastened, as by U-bolts 48, to the rear ends of the frame bars 1, and serve as handles for tipping or rocking the tractor sidewise on the convex or crowned tread of the traction wheel 9, and thereby steering or directing its course as well as guiding the cultivator, which is also connected at the front end of its center beam or bar with the cross bar 2 of the tractor frame behind the traction wheel.

An angular forked clutch shifting lever 50, fulcrumed on the crank case 18 of the engine, is connected by a rod 51 with a lever 52 fulcrumed one one of the frame bars 1, and connected by a rod 53 with a hand lever 54, mounted on a cross rod 55 connecting the handles 47.

An arm 57 on the stem of the throttle valve which controls and regulates the supply of fuel from the carbureter 42 to the engine, is connected by a rod 58 with a rocker arm 59 on one of the frame bars 1, and in turn connected by a rod 60 with a hand lever 61 mounted on the cross rod 55 next to the lever 54 and within convenient reach of the operator or driver.

In the operation of the tractor, it is steered, and the cultivator 46 or other machine or implement attached thereto, is guided by means of the handles 47. Tipping or rocking the tractor on the convex or crowned tread of the traction wheel 9 to the right or left more or less, causes it to turn correspondingly in the same direction. The speed at which the tractor is driven is controlled and regulated by means of the hand lever 61, which operates the throttle valve of the engine, and the tractor is stopped and started when the engine is in operation, by means of the hand lever 54, which shifts the clutch 29 into and out of engagement with the worm gear 26.

The convex or crowned shape of the tread of the traction wheel 9 not only facilitates tipping or rocking it sidewise for steering the tractor, but also affords a firmer hold or engagement of the wheel with the ground over which it travels, particularly soft or loose ground.

The water tank 31 with its contents mounted on the front end of the frame, counterbalances or partially counterbalances, the cultivator or other implement attached to the rear end of the frame, making it easier for the operator to handle the machine.

The motor or engine with the transmission mechanism connecting it with the traction wheel and the pump, being mounted within the traction wheel mainly below its axis, locates the center of gravity of the tractor below the axis of the traction wheel, avoids top-heaviness and the liability of the tractor to tip over when it is rocked to either side in steering it, besides making the machine less cumbersome and unwieldy.

The disposition of the crank or driving shaft 21 of the engine on which the fly-wheel 23 is mounted lengthwise of the tractor below and parallel with the side bars 1 and transversely to the axis of the traction wheel, prevents the gyroscopic action of the fly-wheel from resisting or interfering with rocking the tractor sidewise, and thus greatly facilitates steering the tractor and guiding the cultivator or other machine or implement attached thereto.

The gasolene or fuel oil reservoir 40, which is preferably made of segmental shape, as shown in Fig. 1, being mounted close to and over the traction wheel 9, serves as a guard or shield therefor. Between the tank 31 and the reservoir 40, the traction wheel may be covered by a sheet metal plate or shield 63, as shown in Fig. 1.

The cultivator 46, shown in Figs. 1 and 2, can be easily disconnected from the tractor by removing the U-bolts 48 and the bolt fastening the center beam to the cross member 2, and the tractor may be attached to or connected in a like or similar manner and used with any other machine or implement to which it may be adapted.

Various changes in the details of construction and arrangement of parts may be made without departing from the principle and scope of the invention as defined in the following claims.

We claim:

1. In a tractor the combination of a portable frame provided with steering handles, a single supporting and traction wheel mounted in the frame and having a crowned tread on which the tractor is adapted to be tipped sidewise by the steering handles, a motor mounted on the frame, and transmission mechanism for connecting the motor with the traction wheel.

2. In a tractor the combination of a frame provided with steering handles, a single supporting and traction wheel mounted in the frame and having a crowned tread on which it is adapted to be rocked sidewise by the steering handles, a motor carried by the frame, and transmission mechanism for connecting the motor and traction wheel comprising a drive shaft provided with a fly wheel and having its axis disposed lengthwise of the tractor and transversely to the axis of the traction wheel.

3. In a tractor the combination of a frame provided with steering handles, a single spokeless and webless traction and supporting wheel rotatably mounted in said frame and having a crowned tread on which it is adapted to be rocked sidewise by the steering handles, a motor carried by the frame within the traction wheel, and transmission mechanism for connecting the motor with the traction wheel.

4. In a tractor the combination of a frame provided with steering handles, a single spokeless and webless traction and supporting wheel rotatably mounted in said frame and having a convex tread on which it is adapted to be rocked sidewise by the steering handles, a motor carried by the frame within the traction wheel, and transmission mechanism for connecting the motor and traction wheel, the motor and transmission mechanism being disposed within the traction wheel to locate the center of gravity of the tractor below the axis of the wheel.

5. In a tractor the combination of a frame provided with steering handles, a single traction and supporting wheel mounted in the frame and having a convex tread, on which it is adapted to be rocked sidewise by the steering handles and which is provided with an outwardly projecting circumferential flange, a motor carried by the frame and transmission mechanism for connecting the motor with the traction wheel.

6. In a tractor the combination of a frame with steering handles and at intervals in a circle with rollers, a spokeless traction wheel rotatably mounted on said rollers and having a crowned tread on which the tractor is adapted to be rocked sidewise by the handles for steering it, a motor supported by the frame within the traction wheel, and transmission mechanism for operatively connecting the motor with the traction wheel comprising a fly-wheel and driving shaft disposed lengthwise of the tractor and transversely to the axis of the traction wheel.

7. In a tractor the combination of a frame comprising spaced side members and provided at intervals in parallel circles with rollers, a spokeless and webless traction wheel rotatably mounted and guided on said rollers and provided with internal circular racks, a shaft mounted in the frame parallel with the axis of the traction wheel and provided with pinions meshing with the racks, an internal combustion engine carried by the frame inside of the traction wheel with the engine cylinder extending upwardly into the upper part of the wheel, transmission mechanism for connecting the engine with the pinion shaft, and a housing attached to the frame, inclosing the transmission mechanism and racks and pinions with the inner side of the traction wheel rim, and formed with an opening in which the engine cylinder is exposed to the atmosphere on both sides of the tractor.

8. In a tractor the combination of a frame provided with steering handles, a single spokeless supporting steering and traction wheel rotatably mounted in the frame and having a convex tread on which it is adapted to be rocked by the steering handles, an internal combustion engine carried by the frame within said wheel and having a water jacketed cylinder, transmission mechanism for connecting the engine with the traction wheel, a water tank mounted on the frame in front of said wheel and connected with the jacket of the engine cylinder, and an oil reservoir mounted on the frame behind said wheel and tending with the water tank to balance the tractor on said wheel.

In witness whereof we hereto affix our signatures.

ALBERTUS J. LEHMAN.
GEORGE J. LEXA